Aug. 7, 1945.          R. H. BLANK          2,381,484
HYDRAULIC SAFETY VALVE
Filed Feb. 2, 1943
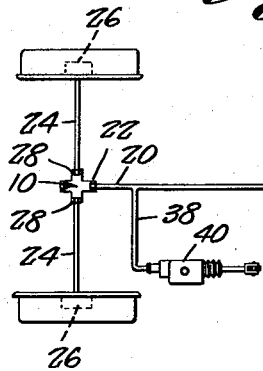
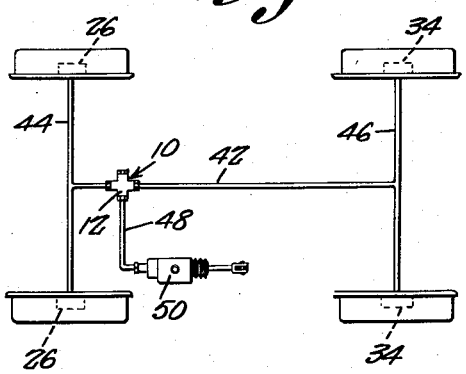
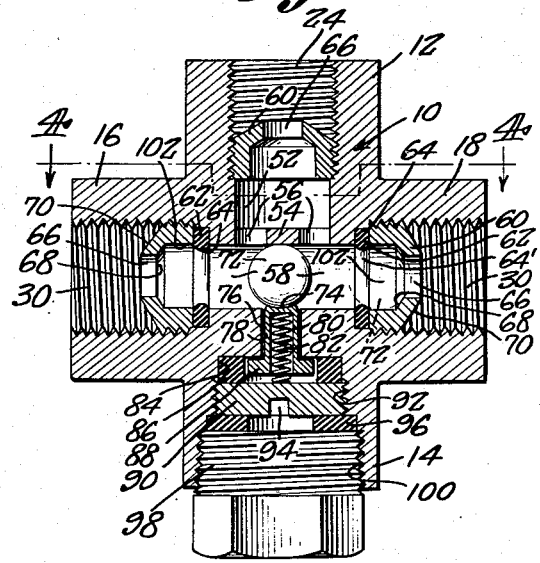
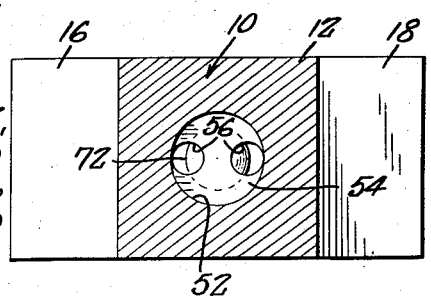
Rudolph H. Blank,
INVENTOR.
BY
*Victor J. Evans & Co.*
ATTORNEYS Patented Aug. 7, 1945

2,381,484

UNITED STATES PATENT OFFICE 2,381,484

HYDRAULIC SAFETY VALVE

Rudolph H. Blank, Treadwell, N. Y.

Application February 2, 1943, Serial No. 474,457

1 Claim. (Cl. 251—118)

My invention relates to the distribution of liquids, gases and the like to a plurality of points from a single source of supply, and has among its objects and advantages the provision of an improved automatic shut-off valve designed to cut off that portion of the system in which a leak may occur to prevent complete failure of the entire system by continued loss of the liquid or gas. While the invention is suitable for use in various types of fluid distributing systems employing multiple delivery from one source of supply, the invention is particularly suitable for use in connection with the hydraulic braking systems of automotive vehicles. The safety valve is set in operation through the influence of pressure differentials, as between the difference in pressures between the broken and unbroken portions of the system.

In the accompanying drawing:

Figure 1 is a diagrammatic plan view of a hydraulic braking system of the four wheel type illustrating two valves incorporated therein.

Figure 2 is a similar view employing one valve.

Figure 3 is a sectional view of the valve, and

Figure 4 is a sectional view along the line 4—4 of Figure 3.

In the embodiment of the invention selected for illustration, Figure 3 illustrates a valve body 10 provided with bosses 12, 14, 16 and 18. The bosses 12 and 14 are coaxial and the bosses 16 and 18 are also coaxial one with the other but with their common axis arranged at right angles to the common axis of the bosses 12 and 14.

In an installation according to Figure 1, the boss 12 is connected with a brake line 20 through the medium of a compression nut 22 threaded into the threaded bore 24 of the boss 12. The brake lines 24 leading to the front wheel brake units 26 are respectively connected with the bosses 16 and 18 through the medium of compression nuts 28 threaded into the threaded bores 30 of the bosses.

The brake lines 32 leading to the rear wheel brake units 34 are respectively connected with the bosses 16 and 18 of a second valve unit identical with that of Figure 3, while the boss 12 of this valve unit is connected with a brake line 36. The two brake lines 20 and 36 have communication with a brake line 38 leading to a master cylinder 40 of the hydraulic braking system. Such master cylinders and their operation are well known in the art. The installation of Figure 2 differs from that of Figure 1 in that one valve unit only is employed, which valve unit is interposed in the brake line 42 leading to the front and rear brake fluid distributing lines 44 and 46, respectively. The boss 12 in the installation of Figure 2 connects with a brake line 48 leading to the master cylinder 50.

The valve body 10 is provided with a chamber 52 having a wall 54 provided with two ports 56 communicating with a bore 58 coaxial with the bosses 16 and 18. Adapters 60 are threaded into the bores 30 for compressing rubber washers 62 against annular shoulders 64 in the valve body 10. Both washers 62 have original inside diameters equal to that of the bore 58 and are compressed to constrict the inside diameters slightly and to provide rounded faces 64'.

Each adapter 60 is provided with a fluid passage 66 and a valve seat 68. Both adapters are also provided with conical faces 70 coacting with the flared connections of the compression nuts, not shown. Such connections are old and well known in the art and need not be described in further detail.

Inside the bore 58 is mounted a ball valve element 72. This valve is normally seated on the concaved face 74 of a pin 76 slidable freely in a bore 78 in the valve body 12. This bore is arranged at right angles to the axis of the bore 58 and is located equal distances from the two valve faces 68. The pin 76 is yieldingly urged against the element 72 by a compression spring 80 mounted in the bore 82 of the pin 76. Thus the element 72 is pressed against the face of the bore 58 to be releasably supported against accidental displacement. The element 72 may be displaced from its seat 74 only through a predetermined unbalanced fluid pressure condition on opposite sides of the element.

Ports 56 respectively communicate with the bore 58 on opposite sides of the element 72. A bore 84 is provided in the valve body 10 for the reception of a rubber washer 86 having an inside diameter loosely housing a flange 88 on the pin 76. An adjusting screw 90 is threaded into a bore 92 coaxial with the bore 84 and engages the washer 86. The spring 80 abuts the screw 90 and the tension of the spring may be varied through adjustment of the screw, the latter being provided with a slot 94 for the reception of a screw driver.

A rubber sealing washer 96 lies against the screw 90 and is engaged by a screw plug 98 threaded into a bore 100 in the boss 14. Thus the boss 14 provides a sealed condition against the escape of fluid or gases under pressure in the valve body.

The adapters 60 include bores 102 having diameters permitting the element 72 to move freely therein for engagement with the valve faces 68, although the washers 62 offer some resistance to passage of the element into the bores. However, the element 72 is held against the engaging valve face 68 by the adjacent washer 62 after the element has been pressed through the washer.

Under normal operating conditions, the fluid or gas under pressure from its source of supply passes through the adapter 60 in the boss 12, enters the chamber 52 and passes through the ports 56 for delivery to the bore 58 on opposite sides of the element 72. The fluid then passes through the adapter 60 in the bosses 16 and 18 for delivery to the points of application. In a hydraulic braking system under normal conditions, the fluid under pressure exerts an equal pressure throughout the entire system. Thus the pressures effective on the element 72 are equal and the element remains in its normal full line position of Figure 3.

When the normal condition is changed, the pressures effective on the element 72 become unbalanced and the element is caused to move in the direction of the low pressure side of the valve. Figure 3 illustrates the valve 72 in dotted lines and in engagement with the valve face 68 in the boss 18. This position of the element is taken whenever there is a loss of pressure in the distributing line communicating with the boss 18. With the element 72 in its dotted line position, further loss of fluid is prevented so as to maintain the remainder of the braking system in normal operating condition.

The maximum amount of liquid that can be distributed through a multiple connection cannot exceed the amount which may be delivered to the smallest cross sectional area of the conduit supplying the distributing connection. Therefore in order to distribute this maximum amount through the outlets of the multiple connection, the total area of the outlets need not exceed the smallest area of the inlet or supply. Regardless of the number of outlets in a distributing connector, the total or maximum quantity that may be delivered cannot be greater than the amount supplied to the connector or point of distribution. Accordingly the amount of liquid at the bosses 16 and 18 would not be greater than that supplied through the boss 12.

Since the amount of fluid at the distributing outlets is not greater than that admitted on the inlet side and the total cross sectional area of the ports 56 is less than the smallest cross sectional area on the inlet side, the volumetric capacity of the outlet sides is greater than the capacity of the ports 56. By the reduction of the ports 56, a reserve of liquid and pressure is built up in the ports and back to the source of supply, which is employed in unseating the element 72. The pressure in the small ports 56 is equal at all times in a normal system and when a break occurs, the pressure on the side of the break beyond the small port 56 on that side is reduced, but the pressure on the unbroken side is maintained at that of the small port 56 on that side of the outlet. This higher pressure on the unbroken side moves the element 72 off its seat and into engagement with the seat 68 on the broken or low pressure side, thus preventing loss of fluid on the broken side but permitting operating pressure to be maintained on the unbroken side. The rubber washer 62 on the broken side holds the element 72 against the seat 68 when the pressure on the element is reduced.

Without further elaboration, the foregoing will so fully explain my invention, that others may, by applying current knowledge, readily adapt the same for the use under various conditions of service.

I claim:

In a valve for a fluid distributing system, a body having an elongated cylindrical chamber centrally thereof and co-axial with an outlet passage at each end, said body also having an inlet passage perpendicular to the medial portion of the chamber, a partition fixed in the inner end of the inlet passage having a pair of transversely spaced inlet ports the diameter of each of said ports being appreciably less than the smallest diameter of the inlet passage or either of the outlet passages, a ball valve mounted in the passage and normally disposed in substantially sealing contact with the partition between its ports, an adjustable spring pressed member having a concaved inner end resiliently engaging the ball to releasably hold the same in its normal center position, a seat in each outlet passage adapted to receive the ball valve upon reduction of pressure in the respective passage, and compressed resilient means for holding the valve in either of its seated positions to close one of said outlet passages there being a rounded annular part on each of said means slightly projecting into each of said outlet passages.

RUDOLPH H. BLANK.